(12) United States Patent
Sachs et al.

(10) Patent No.: US 9,166,237 B2
(45) Date of Patent: Oct. 20, 2015

(54) PASSIVE TEMPERATURE SUPERVISION DEVICE FOR A COMPRESSED GAS FUEL TANK

(71) Applicant: GM Global Technology Operations LLC, Detroit, MI (US)

(72) Inventors: Christian Sachs, Frankfurt (DE); Holger Winkelmann, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 376 days.

(21) Appl. No.: 13/771,598

(22) Filed: Feb. 20, 2013

(65) Prior Publication Data

US 2014/0234739 A1    Aug. 21, 2014

(51) Int. Cl.
  *H01M 8/04*  (2006.01)

(52) U.S. Cl.
  CPC ........ *H01M 8/0432* (2013.01); *H01M 8/04201* (2013.01); *Y02E 60/50* (2013.01)

(58) Field of Classification Search
  CPC . H01M 8/0432; H01M 8/04007; Y02E 60/50
  USPC .................................. 429/433, 442; 374/141
  See application file for complete search history.

(56) References Cited

U.S. PATENT DOCUMENTS

| | | | |
|---|---|---|---|
| 4,643,588 A * | 2/1987 | Postle et al. | 374/160 |
| 5,752,552 A * | 5/1998 | Kountz et al. | 141/83 |
| 5,890,544 A * | 4/1999 | Love et al. | 169/51 |
| 6,217,239 B1 * | 4/2001 | Orita et al. | 400/120.01 |
| 2003/0176951 A1 * | 9/2003 | DeMarchi et al. | 700/286 |
| 2009/0277531 A1 * | 11/2009 | Pongraz et al. | 141/4 |
| 2011/0168079 A1 * | 7/2011 | Suda et al. | 116/207 |
| 2011/0280775 A1 * | 11/2011 | Suda et al. | 422/424 |
| 2012/0000574 A1 * | 1/2012 | Nishiumi | 141/94 |
| 2013/0279537 A1 * | 10/2013 | Tang | 374/141 |
| 2014/0120438 A1 * | 5/2014 | Harris et al. | 429/429 |

\* cited by examiner

*Primary Examiner* — Lisa Caputo
*Assistant Examiner* — Philip Cotey
(74) *Attorney, Agent, or Firm* — Dinsmore & Shohl LLP

(57) ABSTRACT

Passive temperature supervision devices for detecting temperature changes in compressed gaseous fuel storage systems of fuel cell systems. More specifically, systems and methods for detecting temperature changes in compressed gaseous fuel storage systems such as compressed gaseous fuel tanks of motor vehicles, where increases and decreases in temperature can be detected without the need for electric supervision systems.

11 Claims, 5 Drawing Sheets

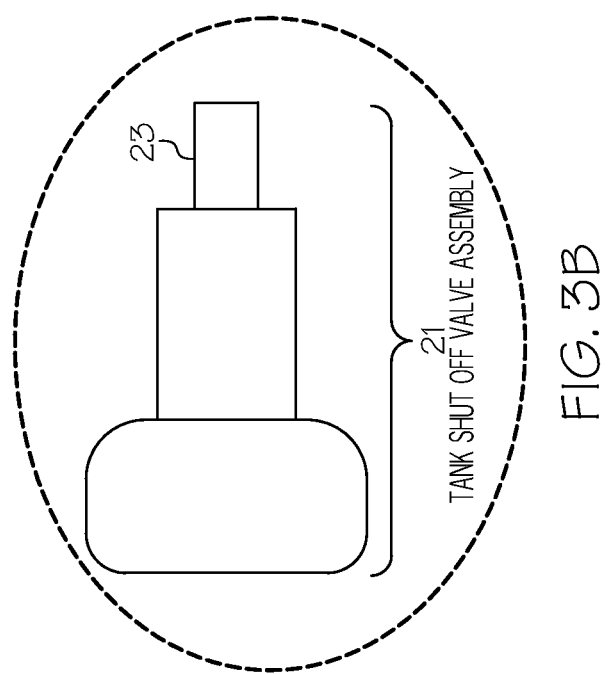
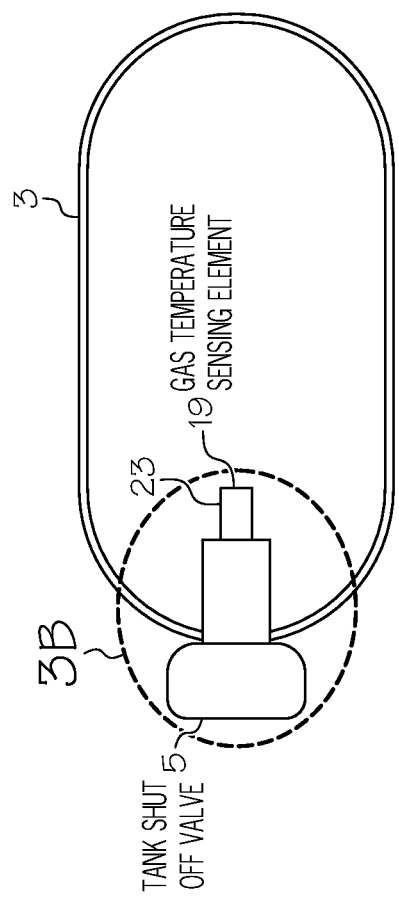
FIG. 3B
FIG. 3A

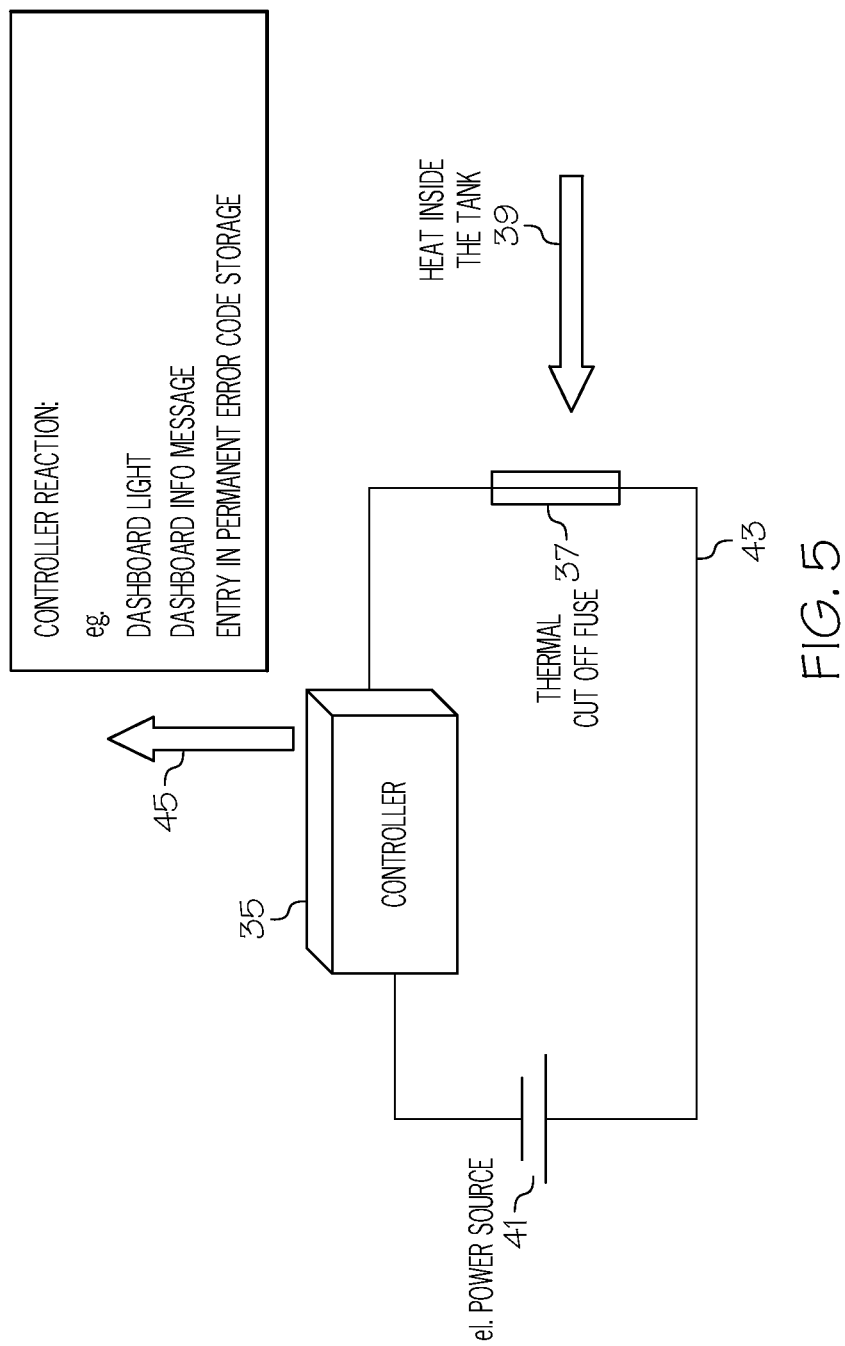

PASSIVE TEMPERATURE SUPERVISION DEVICE FOR A COMPRESSED GAS FUEL TANK

FIELD

The application relates generally to passive temperature supervision devices for detecting temperature changes in compressed gaseous fuel storage systems of fuel cell systems, and to such devices used in conjunction with compressed gaseous fuel storage systems such as compressed gaseous fuel tanks of motor vehicles, where increases and decreases in temperature can be detected without the need for electric supervision systems.

BACKGROUND

The temperature inside of a compressed gaseous fuel gas tank will change during fuel supply and during filling. Also, if fuel is supplied to the engine or to the fuel cell, the temperature of the gas decreases. These effects are due to fundamental laws of thermodynamics. However such tanks have temperature thresholds defined for the compressed gaseous fuel storage system and once the upper or lower limits are exceeded, it is necessary to remove the tanks from service. Current art provides for supervising the gas temperature in the tank using electric temperature sensor(s) together with an electric supervision system. Embodiments herein described provide for advantages over current systems.

Embodiments herein described do not require a constant supply of electricity. Current systems require electricity in order to enable the supervision. The current embodiments provide advantages in situations such as when the vehicle is parked. With current systems the available electricity is limited as it needs to be provided from a limited energy reservoir (e.g. from a rechargeable energy system). Additionally, with current systems, employing an electrical temperature supervision system involves employing vehicle data acquisition, and the energy consumption to perform such operations can be significant. Therefore, if the vehicle is not operated, the temperature supervision is limited to a time interval of currently several minutes. The embodiments herein described address this need in the art. Such embodiments provide constant supervision of temperature, thus increasing efficiency and limiting unnecessary decommissioning of storage systems.

Developing a more energy efficient supervision system beyond currently available systems is desirable, but would still only slightly extend supervision times. Therefore it is desirable to have a passive system in place which permanently stores the information once the tank temperature goes above or below a provided range.

SUMMARY

According to a first embodiment of the present invention, a passive temperature supervision device for detecting a temperature change in a compressed gaseous fuel storage system for supplying gaseous fuel to vehicles that are propelled by a fuel cell system or an internal combustion engine is disclosed. The device includes a passive temperature supervision device coupled to a compressed gas tank and configured to passively detect the change in an internal temperature of the compressed gas tank by an irreversible change in at least one physical property of the passive temperature supervision device.

According to another embodiment of the present invention, a system for detecting a temperature change in a compressed gaseous fuel storage system of a fuel cell system is disclosed. The system includes a passive temperature supervision device coupled to a compressed gas tank. The passive temperature supervision device can be configured to passively detect the change in an internal temperature of the compressed gas tank by a change in at least one physical property of the passive temperature supervision device. The system can include a controller coupled to the passive temperature supervision device and configured to check a circuit for conductivity and to send an error message to a dashboard of a vehicle to inform a user to bring the vehicle in for service when a change of conductivity has been detected indicating the circuit is broken. The system can include a display located on the dashboard of the vehicle configured to display the error message to the user.

According to yet another embodiment of the present invention, a method for detecting a temperature change in a compressed gaseous fuel storage system of a fuel cell system is disclosed. The method includes providing including a passive temperature supervision device coupled to a compressed gas tank. The passive temperature supervision device can be configured to passively detect the change in an internal temperature of the compressed gas tank by an irreversible change in at least one physical property of the passive temperature supervision device. A controller coupled to the passive temperature supervision device can be configured to check a circuit for conductivity and to send an error message to a dashboard of a car to inform a user to bring a vehicle in for service when a change of conductivity has been detected indicating the circuit is broken. A display located on the dashboard of a vehicle configured to display the error message to the user. The method can include detecting the change in the internal temperature of the compressed gas tank through an irreversible change in the at least one physical property of the passive temperature supervision device and checking the circuit for conductivity using the controller. The method can also include sending the error message to the dashboard of the vehicle to inform a user to bring the vehicle in for service when a change of conductivity has been detected indicating the circuit is broken.

BRIEF DESCRIPTION OF THE FIGURES

FIG. 3A is a schematic illustration of a passive temperature supervision device for a compressed gas fuel tank.

FIG. 3B is an enlarged portion of FIG. 3A showing a schematic illustration of a tank shut off valve assembly

FIG. 5 is a schematic illustration of a controller that can react to a thermal cut off fuse such as in embodiments where a passive temperature supervision device is destroyed.

DETAILED DESCRIPTION

Figure 1:
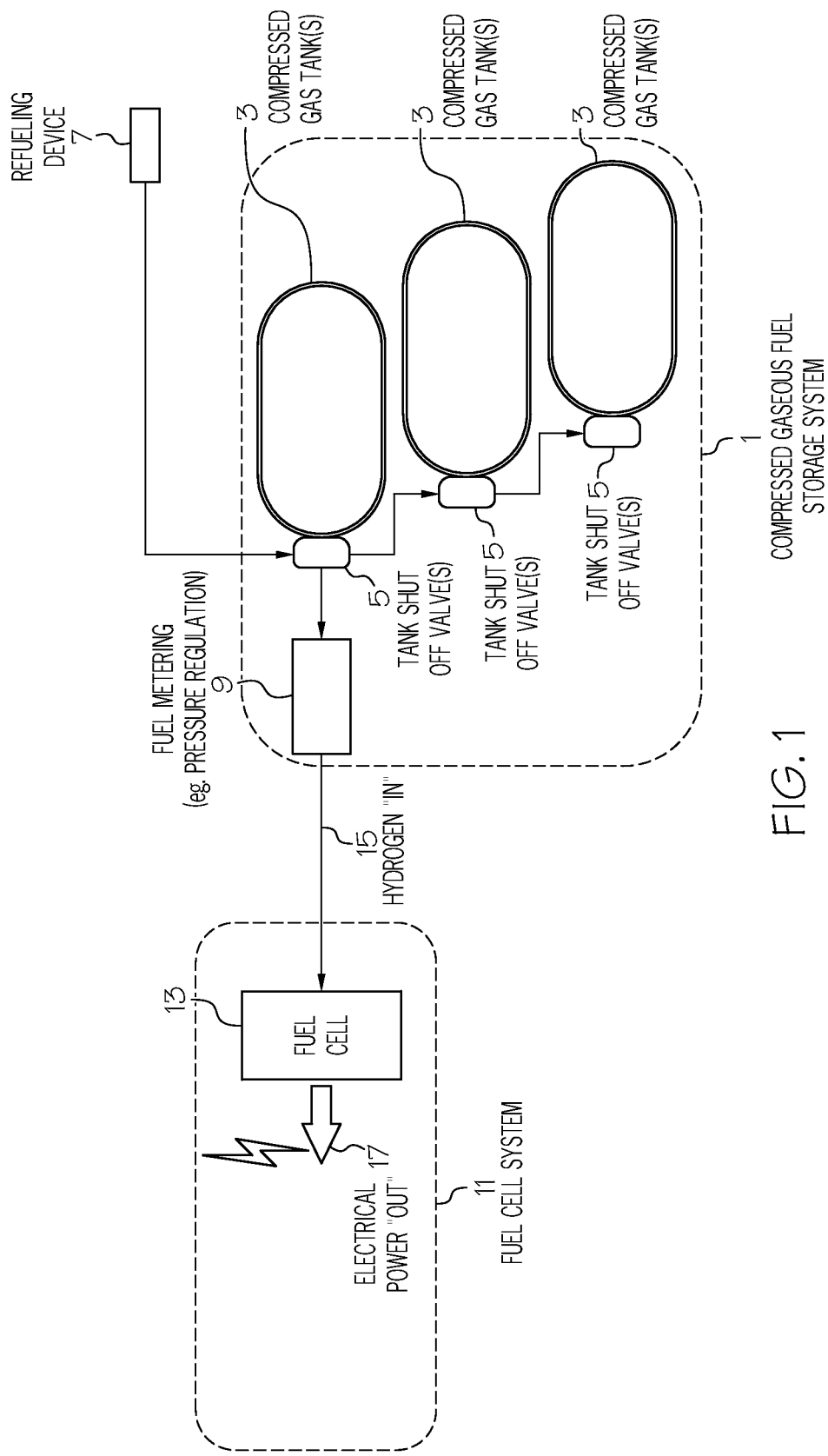
FIG. 1 is a schematic illustration of a fuel cell system and a compressed gaseous fuel storage system including a compressed gaseous fuel tank.

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about," which is intended to mean up to ±10% of an indicated value. Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used herein, the term "passive" refers generally to any measurement methods, which require no electric or electronic system to be active. Therefore, "passive" refers generally to any latched change in device physical properties by environmental change, e.g. temperature overshoot over threshold which causes melting of a thermal fuse. Also, a phase change of a material within the device can be associated with a distinct change in resistivity. The change in resistivity can also be triggered by the burst of a glass bulb containing conductive material.

As used herein, the term "physical integrity" refers to any latched change in any physical property, which can be at any time diagnosed by the controller of a vehicle or which is easily visible as a service indicator.

As used herein, the term "color" refers to any latched change in visibility once a temperature threshold had been exceeded, and which in specific embodiments indicates a need for service.

As used herein, the term "deformation" refers to any latched change in resistivity which can be diagnosed at any time by a controller of the vehicle once a temperature threshold has been exceeded, and which in specific embodiments indicates a need for service.

As used herein, the term "destroyed" refers to any latched change of a measurable device's characteristics affecting the device's physical integrity. An example embodiment includes, e.g., if a glass bulb is destroyed by a frozen liquid.

As used herein, the term "compressed gas fuel tank" refers to any tank system which is designed to store pressurized fuel and which has a specific design that requires an upper or a lower temperature threshold for proper life time usage to be met.

As used herein, the "maximum allowable temperature" is the temperature at which a fuse can latch to the open position and/or can be used to designate a change in the passive temperature supervision device state.

As used herein, the term "holding temperature" is the temperature at which degradation of a fuse or other passive temperature supervision or sensing device over time would be expected or the temperature at which degradation has been shown to begin.

As used herein "tolerance band" includes a band of temperature equal to or less than the difference between the holding temperature and the maximum allowable temperature.

In specific embodiments herein described, a passive temperature supervision device for a compressed gas fuel tank comprises a storage system that is permanently supervised for temperature extremes. With current technology, this continuous supervision cannot be achieved by the vehicle controls system due to limited battery power.

FIG. 1 is a schematic illustration of a fuel cell system and a compressed gaseous fuel storage system including a compressed gaseous fuel tank. Shown is a compressed gaseous fuel storage system 1 including a compressed gas tank(s) 3, and a tank shut off valve(s) 5. Also shown is a refueling device 7, a device for fuel metering (e.g. pressure regulation) 9, and a fuel cell system 11. The fuel cell system 11 is shown with a fuel cell 13 with hydrogen going "IN" 15 and electrical power going "Out" 17. A passive temperature supervision device can be positioned so as to detect a change in the internal temperature of the compressed gas tank(s) 3 by a change in at least one physical property of the device. The change can be irreversible.

Figure 2:
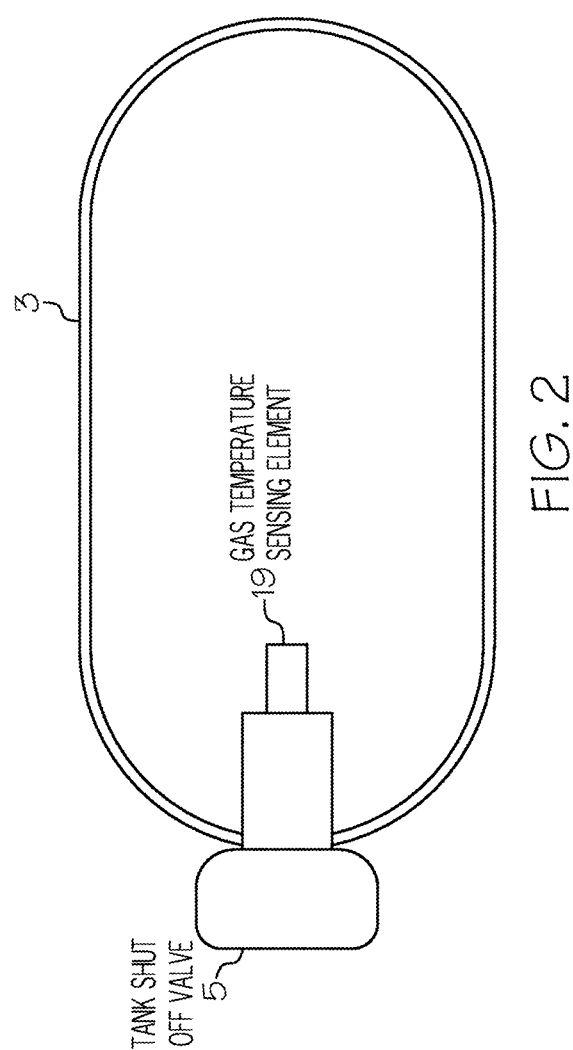
FIG. 2 is a schematic illustration of a compressed gaseous fuel tank and a specific embodiment of a passive temperature supervision device for detecting temperature.

FIG. 2 is a schematic illustration of a compressed gaseous fuel tank and a specific embodiment of a passive temperature supervision device for detecting temperature. Shown is an enlarged section of FIG. 1 illustrating the tank shut off valve 5 and gas tank(s) 3. Also shown is the gas temperature sensing element 19. A temperature sensing element 19 for the gas tank(s) 3 is normally located at the most inner surface of the tank shut off valve 5; a common state of the art location is to have a temperature sensing element 19 stick out the surface of the tank shut off valve 5 body to be less influenced by the thermal capacity of the valve body. In specific embodiments described herein, the passive temperature supervision device is located fully or partly on the inside of the compressed gas tank(s) 3, and in specific embodiments is located at, next to, or is coupled to the tank shut off valve 5. In specific embodiments more than one passive temperature supervision device can be used in a vehicle (e.g., 2, 3, 5 etc).

FIG. 3A is a schematic illustration of a passive temperature supervision device for a compressed gas fuel tank. More specifically, FIG. 3A shows the tank shut off valve 5 and gas temperature sensing element 19 of FIG. 2, along with a metal housing 23. FIG. 3B shows an enlarged image of just a tank shut off valve assembly 21. This assembly can include a passive temperature supervision device. The assembly can also include the metal housing 23 for the entire assembly or for the gas temperature sensing element only. The metal housing can also separate the temperature sensing element 19 from the gas of the tank. The assembly can also include a thermal cut off fuse acting as a passive temperature supervision device or coupled to a fuse or plastic or glass bulb that is the passive temperature supervision device.

Figure 4:
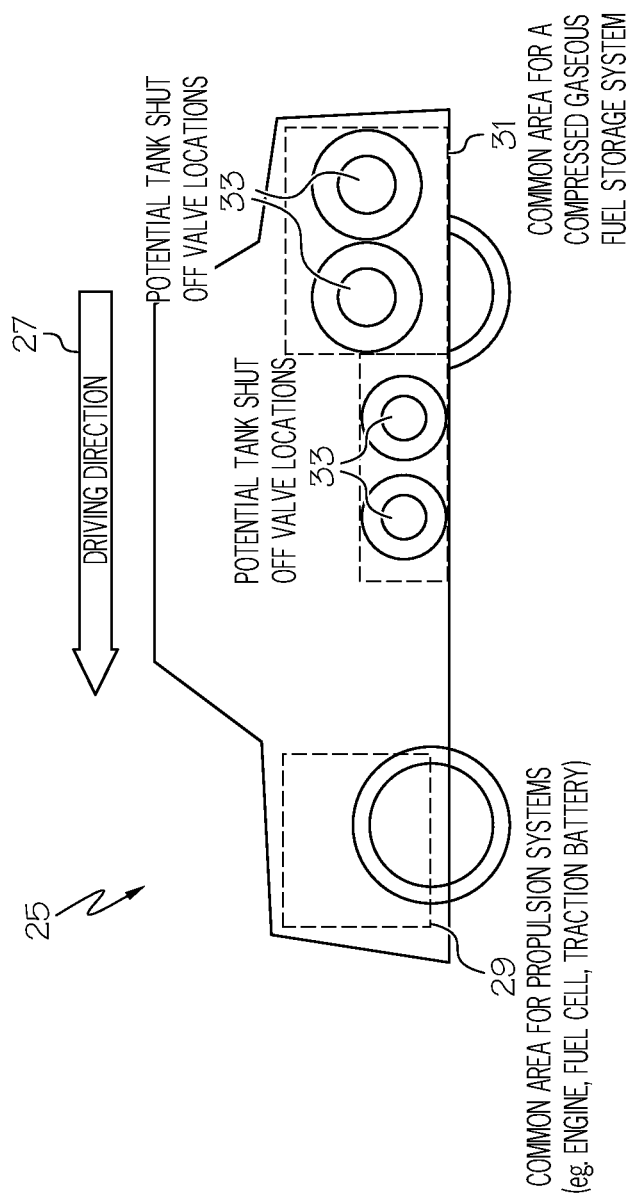
FIG. 4: is a schematic illustration of a compressed gaseous fuel tank onboard of a motor vehicle.

FIG. 4: is a schematic illustration of a compressed gaseous fuel tank onboard of a motor vehicle. FIG. 4 shows a vehicle 25 and the driving direction is shown 27. The common area for a propulsion system 29 is shown, as is a common area for a compressed gaseous fuel storage system 31. Potential tank shut off valve locations are indicated 33. A passive temperature supervision device in specific embodiments can be located near or at the potential tank shut off valve locations 33.

FIG. 5 is a schematic illustration of a controller that can react to a thermal cut off fuse such as in embodiments where a passive temperature supervision device is destroyed. Shown is a controller 35 coupled to a thermal cut off fuse 37 that can cut off upon reaching a temperature threshold. Heat inside the tank is indicated 39. The cut off fuse 37 can act as a passive temperature supervision device or can be coupled to a fuse or plastic or glass bulb that is the passive temperature supervision device. The controller 35 can be coupled to the passive temperature supervision device and configured to check a circuit for conductivity and to send an error message to a dashboard of a car to inform a user to bring a vehicle in for service when a change of conductivity has been detected indicating the circuit is broken. The controller can send a message through a dashboard light, through a dashboard information message, or can enter the information into a permanent code storage 45. For completeness the power source 41 and circuit 43 are shown, and upon destruction of a passive temperature supervision device the circuit can be broken. An advantage of embodiments herein described is that beyond a circuit which checks for conductivity or resistance, computer systems are not required for temperature detection. This provides an advantage over prior art, which can require actively processing measurement data from temperature measurement sensors.

In specific embodiments herein described, a fuel cell system is provided with a passive temperature supervision device for a compressed gas fuel tank. The passive temperature supervision device can be used in a compressed gaseous fuel storage system in combination with any type of transforming energy converter.

In specific embodiments a passive device to detect whether predefined temperature extremes have been overrun (high or low) is provided. Typical ranges are from about −40° C. to about 85° C. (for hydrogen). Once the extreme has been exceeded by the gas temperature, this information can, in specific embodiments, results in a change in the device by an irreversible exclusive change in the fundamental physical properties of the device. For example, properties such as electrical conductivity, physical integrity, color, deformation (such as plastic deformation), and/or other properties can change. Once the storage supervision system is restarted, this information can be used for a self-check. In specific embodiments the vehicle controller would check a specific circuit for conductivity, and when a change of conductivity has been detected indicating the circuit is broken (such as by a blown fuse) the controller can in specific embodiments send an error message to the dashboard to inform the driver to bring the vehicle in for service. If the temperature goes outside the allowed operating range, the storage system can be put out of service.

In specific embodiments the electrical conductivity of the passive temperature supervision device is changed as the temperature changes occur when thresholds are exceeded. In various embodiments the electrical conductivity can change by 100 percent. In specific embodiments a thermal fuse would open the circuit and deliver a plain "Yes" or "No" response; if the threshold was exceeded in an unsupervised time interval this would be indicated by the thermal fuse.

For the supervision of a maximum allowable temperature (in specific embodiments, 85° C.) one can in specific embodiments chose a fuse that can latch to the open position at a temperature that can include the tolerance band between the maximum allowable temperature and the temperature at which degradation of a fuse or other passive temperature supervision or sensing device over time would be expected (the holding temperature). The fuse can open at the maximum allowable temperature and/or can be set to open at a temperature several degrees away from the maximum allowable temperature known as the holding temperature if the holding temperature is reached or exceeded for at least a set time. In specific embodiments the holding temperature plus the band equals the maximum allowable temperature, and in other specific embodiments the difference between the maximum allowable temperature and the holding temperature is greater than the band. In specific non-limiting examples of the tolerance band, the band is within a range of about 0.001 to about 5 degrees Celsius away from the maximum allowable temperature. In other specific embodiments, the range is from about 1 to about 20 degrees Celsius. The time for holding at or above the holding temperature prior to the fuse breaking can be from one second to a day, to a week or more. The fuse can also be set so that repeated usage above the holding temperature will lead to the fuse breaking. The holding temperature would not lead to an immediate failure of the storage system but repeated usage with temperature spikes up to this threshold would degrade the system and would affect the validated lifetime prediction. One example embodiments is as follows: a validated vessel maximum peak temperature equals 100 degrees Celsius, a cut off fuse is used with a maximum allowable temperature of 98 degrees Celsius and a holding temperature of 83° C. (such as a Cantherm® fuse type L50N). FIG. 5 shows an example of a controller configured to react to a thermal cut-off fuse that can change phase due to a change in the physical properties of the passive temperature supervision device.

In specific embodiments properties herein described change for part of the device and in other embodiments, characteristics of the whole device change. In specific embodiments one device can be used to detect one or more of electrical conductivity, physical integrity, color, deformation, and in other specific embodiments one device is used to supervise each property.

In various embodiments the passive temperature supervision device is used in conjunction with pressure monitoring and a computerized system automatically determines whether various temperature and/or pressure thresholds have been exceeded so as to determine whether a tank should be decommissioned and provide output to a user. In specific embodiments a warning system coupled to the passive temperature supervision device uses a dashboard service indicator light to indicate service is needed immediately, or in the near futures (e.g., 1-10 days or more) when there is a change in the device.

In specific embodiments herein described, methods, devices, and systems can include one or more of: a passive temperature supervision device wherein a physical property of the passive temperature supervision device that changes upon a change in temperature is one or more of resistivity, physical integrity, color, and plastic deformation. The systems and methods can include a passive temperature supervision device comprising a glass bulb containing conductive material configured to burst when an upper temperature threshold is exceeded, or can include a passive temperature supervision device comprising a liquid-filled glass capsule configured to burst due to a freezing of a liquid in the liquid-filled glass capsule when a lower temperature threshold is exceeded. The passive temperature supervision device can comprise a glass bulb containing conductive material configured to burst when an upper temperature threshold is exceeded and when a lower temperature threshold is exceeded. The conductive material can be a mixture of two liquids with different freezing points. The passive temperature supervision device can comprise a fuse configured to latch to the open position at a temperature that would include a tolerance band between the maximum allowable temperature and the temperature at which degradation of the passive temperature supervision device would be expected to occur. The passive temperature supervision device can comprises a glass capsule coupled to a fuse wherein the fuse is configured to latch to the open position upon bursting of the glass capsule due to a temperature threshold being exceeded.

EXAMPLES

The present invention will be better understood by reference to the following examples which are offered by way of illustration rather than limitation.

Example 1

Thermally-Activated Fuses to Detect Upper Temperature Limits

In specific embodiments herein described, an upper temperature limit is provided (threshold), and when the upper temperature limit is exceeded, a thermally-activated fuse can be connected in series to the passive temperature supervision device. The upper limits can also be detected by liquid-filled glass capsules.

Example 2

Liquid-Filled Glass Capsules Detect Lower Temperature

In specific embodiments herein described, the passive temperature supervision device comprises a liquid-filled glass capsule; a lower temperature limit is provided, and when the lower temperature limit is exceeded, a liquid-filled glass capsule can be used which will be destroyed upon freezing of an electrically conductive liquid. This embodiment is conceptually equivalent to a thermal fuse where the electrically conductive liquid replaces the fusible wire. In specific embodiments a distinct change in density of the liquid is triggered by temperature, and the glass bulb is destroyed. In various embodiments the density change is detected through density measurements or via changes in physical integrity of the passive device throughout the time until destruction; in other embodiments changes in the physical integrity of the passive device leads to a warning signal to users (such as an output signal in a light on the dash of a car) prior to or at the time of destruction of the passive device.

Example 3

Adjusting Capsule-Burst Temperature with Liquid-Filled Glass Capsules Using Mixed Liquids and Detecting Upper Temperature Limits, Lower Temperature Limits, or Both In even more specific embodiments of the passive temperature supervision device described herein, a lower temperature limit is provided, and when the lower temperature limit is exceeded, a liquid-filled glass capsule can be used which will be destroyed upon freezing of the liquid. By mixing together liquids with different freezing points, the burst temperature of the capsule can be adjusted. In specific, non-limiting embodiments the burst temperature can be set by mixing two liquids such as water and ethanol together. Water has a boiling point of 100° C. and a melting point of 0° C., while ethanol has a boiling point of 78.4° C. and a melting point of −114° C. By mixing both liquids, any lower temperature threshold for a burst temperature can be set for a point between about −114° C. and about 0° C., and similarly any upper temperature threshold can be set for a point burst temperature between about 78.4° C. and about 100° C.

The bursting of the capsule can be detected by a second order change of the adjacent components. For example, a fuse might be physically connected to the capsule and can be automatically activated once the capsule bursts.

The fuse for detecting low temperature extremes can be the same one (or more fuses) used for the high temperature extreme detection described in example 1, thereby integrating the detection of the upper and the lower limit in one device or it could be connected separately to indicate which limit was exceeded.

While certain representative embodiments and details have been shown for purposes of illustrating the invention, it will be apparent to those skilled in the art that various changes may be made without departing from the scope of the invention, which is defined in the appended claims.

What is claimed is:

1. A system for detecting a temperature change in a compressed gaseous fuel storage system of a fuel cell system comprising:
   a temperature-sensing circuit cooperatively coupled to a compressed gas tank of the compressed gaseous fuel storage system;
   a passive temperature supervision device coupled to the compressed gas tank and the circuit and configured to passively detect the change in an internal temperature of the compressed gas tank by an irreversible change in at least one physical property of the passive temperature supervision device;
   a controller coupled to the passive temperature supervision device and configured to check the circuit for conductivity and to send an error message to a dashboard of a vehicle to inform a user to bring the vehicle in for service when a change of conductivity has been detected indicating the circuit is broken; and
   a display located on the dashboard of the vehicle configured to display the error message to the user.

2. The system of claim 1 wherein the at least one physical property of the passive temperature supervision device is selected from the group comprising resistivity, physical integrity, color, and plastic deformation.

3. The system of claim 1 wherein the at least one physical property of the device comprises at least two physical properties selected from the group comprising resistivity, physical integrity, color, and plastic deformation.

4. The system of claim 1 wherein the passive temperature supervision device comprises a glass bulb containing a conductive material configured to burst when an upper temperature threshold is exceeded.

5. The system of claim 1 wherein the passive temperature supervision device comprises a liquid-filled glass capsule configured to burst due to a freezing of a liquid in the liquid-filled glass capsule when a lower temperature threshold is exceeded.

6. The system of claim 1 wherein the passive temperature supervision device comprises a fuse configured to latch to an open position at a temperature that would include a tolerance band between the maximum allowable temperature and a holding temperature.

7. The system of claim 1 wherein the passive temperature supervision device comprises a glass capsule coupled to a fuse wherein the fuse is configured to latch to an open position upon bursting of the glass capsule due to a temperature threshold being exceeded.

8. The system of claim 1 wherein the passive temperature supervision device comprises a glass bulb containing conductive material configured to burst when an upper temperature threshold is exceeded and when a lower temperature threshold is exceeded.

9. The system of claim 8 wherein the conductive material is a mixture of two liquids with different freezing points.

10. A method for detecting a temperature change in a compressed gaseous fuel storage system of a fuel cell system, the method comprising:
   providing a system comprising:
      a temperature-sensing circuit cooperatively coupled to a compressed gas tank of the compressed gaseous fuel storage system;
      a passive temperature supervision device coupled to the compressed gas tank and the circuit and configured to passively detect the change in an internal temperature of the compressed gas tank by an irreversible change in at least one physical property of the a passive temperature supervision device;
      a controller coupled to the passive temperature supervision device and configured to check the circuit for conductivity and to send an error message to a dashboard of a car to inform a user to bring a vehicle in for service when a change of conductivity has been detected indicating the circuit is broken; and
      a display located on the dashboard of a vehicle configured to display the error message to the user;
   detecting the change in the internal temperature of the compressed gas tank through a change in the at least one physical property of the passive temperature supervision device;
   checking the circuit for conductivity using the controller;
   sending the error message to the dashboard of the vehicle to inform a user to bring the vehicle in for service when a change of conductivity has been detected indicating the circuit is broken.

11. The method of claim 10 wherein the passive temperature supervision device comprises a glass bulb containing a conductive material configured to burst when an upper temperature threshold is exceeded and when a lower temperature threshold is exceeded.

\* \* \* \* \*